(12) United States Patent
Triantopoulos et al.

(10) Patent No.: US 6,640,873 B2
(45) Date of Patent: Nov. 4, 2003

(54) EXOTHERMIC WELD MOLD ASSEMBLY

(75) Inventors: George Triantopoulos, Collierville, TN (US); David Henderson, Olive Branch, MS (US); Jerry Woodward, Collierville, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/055,628

(22) Filed: Jan. 23, 2002

(65) Prior Publication Data

US 2002/0104953 A1 Aug. 8, 2002

Related U.S. Application Data

(60) Provisional application No. 60/265,845, filed on Feb. 1, 2001.

(51) Int. Cl.[7] .............................................. B23K 23/00
(52) U.S. Cl. ................................ 164/DIG. 12; 164/54; 228/234.3
(58) Field of Search ........................... 164/DIG. 12, 54; 228/234.3; 249/86

(56) References Cited

U.S. PATENT DOCUMENTS

| | | | | |
|---|---|---|---|---|
| 2,957,214 A | * | 10/1960 | Kuharski .................... | 164/54 |
| 3,020,608 A | | 2/1962 | Gelfand ...................... | 22/116 |
| 3,234,603 A | * | 2/1966 | Leuthy et al. .............. | 164/108 |
| 3,782,677 A | * | 1/1974 | Gelfand ...................... | 249/97 |
| 5,062,903 A | | 11/1991 | Bronan et al. ............... | 148/24 |
| 5,145,106 A | | 9/1992 | Moore et al. | |
| 5,533,662 A | | 7/1996 | Stidham et al. .............. | 228/33 |
| 5,647,425 A | | 7/1997 | Foutz et al. | |
| 5,715,886 A | * | 2/1998 | Fuchs ......................... | 164/54 |
| 5,829,510 A | * | 11/1998 | Fuchs ......................... | 164/54 |
| 5,954,261 A | | 9/1999 | Gaman | |
| 6,316,125 B1 | * | 11/2001 | Gaman et al. .............. | 428/654 |

FOREIGN PATENT DOCUMENTS

| | | | |
|---|---|---|---|
| EP | 0 802 014 A2 | | 10/1997 |
| EP | 0 875 330 A1 | | 11/1998 |
| FR | 1 327 977 | | 5/1963 |
| FR | 1 416 146 | | 10/1965 |
| GB | 2 065 528 A | * | 7/1981 |

* cited by examiner

*Primary Examiner*—Tom Dunn
*Assistant Examiner*—Kevin McHenry
(74) *Attorney, Agent, or Firm*—Hoffmann & Baron, LLP

(57) ABSTRACT

An exothermic weld mold assembly for forming conductor to conductor welded connections. The exothermic weld mold assembly includes a crucible section having a U-shaped reaction chamber with exothermic material therein, and a mold section having a plurality of flat vertical exterior surfaces with holes drilled perpendicularly through the flat surfaces. A weld chamber is centrally located within the mold section, the weld chamber and the reaction chamber being communicably connected by a vertically extending tap hole. The holes are outfitted with guide sleeves projecting outwardly from the weld chamber. Conductors to be welded are inserted into the weld chamber through the guide sleeves.

17 Claims, 3 Drawing Sheets

EXOTHERMIC WELD MOLD ASSEMBLY

This application claims priority to the provisional application Ser. No. 60/265,845, filed on Feb. 1, 2001.

FIELD OF THE INVENTION

The present invention relates generally to weld assemblies for forming conductor to conductor welded connections and more particularly to single use weld molds for exothermically creating more easier and efficient welded electrical connections.

BACKGROUND OF THE INVENTION

Exothermic weld assemblies are useful to connect two or more conductors, such as electrical wires to grounding rods or reinforcing rods and the like. Exothermic welds have long been recognized as having an excellent electrical quality connection between two or more conductors. Exothermic welds provide low resistance, high ampacity and long-lasting, reliable grounding connections.

Conventional exothermic weld assemblies typically have a crucible in a top section in fluid communication with a mold section therebelow by a tap hole extending from the bottom of the crucible. The crucible includes a chamber for holding a quantity of exothermic material. The mold section has a weld chamber in which the ends of the conductors to be welded together are inserted therein. The crucible and mold may be designed as a single unit or two individual units and each unit may be disposable or reusable.

The exothermic material in the crucible is ignited to produce a chemical reaction that is completed typically in seconds and produces a molten metal. The liquid metal flows from this crucible section into the weld chamber of the mold section where it envelops the ends of the conductors causing them to melt and thereby weld together.

The ends of the conductors to be welded are inserted into the weld chamber via guide holes, which allow the weld chamber to communicate with the outside of the weld assembly. Typically, these guide holes are formed by drilling a hole through the mold of the weld assembly into the weld chamber. Multiple guide holes may be drilled depending upon the application and the number of conductors to be joined. The target conductors that are to be welded together are then inserted into the weld chamber via the guide holes. Examples of such exothermic weld molds are disclosed U.S. Pat. No. 3,020,608 ('608 patent) and U.S. Pat. No. 5,715,886 ('886 patent), which are incorporated herein by reference.

Conventional weld molds are disposable, single use units that are generally circular shaped structures and, as such, have a curved outer surface. One of the problems with conventional weld mold assemblies is that it is difficult to drill the requisite holes leading into the weld chamber on the circular surface of the weld assembly as shown in the '886 patent. Additionally, it is difficult to accurately and efficiently drill multiple holes in a weld assembly with a curved surface. Thus, conventional exothermic weld assemblies are less than satisfactory.

Accordingly, it would be desirable to provide an exothermic weld assembly with a flat outer surface that allows for easy, accurate and highly efficient drilling of holes.

SUMMARY OF THE INVENTION

An exothermic weld mold assembly for forming conductor to conductor welded connections, having preferably an octagonal body which allows for flat surfaces to be drilled perpendicular, therefore allowing for more easier and efficient production of wire holes. In addition, the flat surfaces provide for easier and more effective positioning within fixtures used for secondary operations.

In accordance with one embodiment of the present invention, there is provided an exothermic disposable weld mold assembly having a crucible section including a reaction chamber. A mold section having a weld chamber in communication with the reaction chamber. The mold section includes a plurality of flat exterior surfaces, where at least two of such surfaces each have a hole extending therethrough in communication with the weld chamber. In this assembly, both the crucible section and the mold section are designed as a single unit, permanently attached and disposed after use.

In accordance with another embodiment of the present invention, there is provided an exothermic weld mold assembly having a reusable crucible section including a reaction chamber. The crucible section has an open top for receiving an exothermic material in the reaction chamber. Also included is a disposable mold having a plurality of flat exterior surfaces, a top portion and a bottom portion. A weld chamber is located between the top and the bottom portion of the mold. The weld chamber has an opening to the top portion of the mold which is in communication with the reaction chamber. A hole extends through at least two of the flat exterior surfaces and communicates with the weld chamber. Additionally, a conductor is disposed in at least two holes with ends of the conductors projecting into the weld chamber. In this assembly, both the crucible section and the mold sections are designed as two individual units, temporarily attached, where the crucible section can be reused while the mold section is disposed after use.

DETAILED DESCRIPTION OF THE PREFERRED EMBODIMENT

Figure 1:
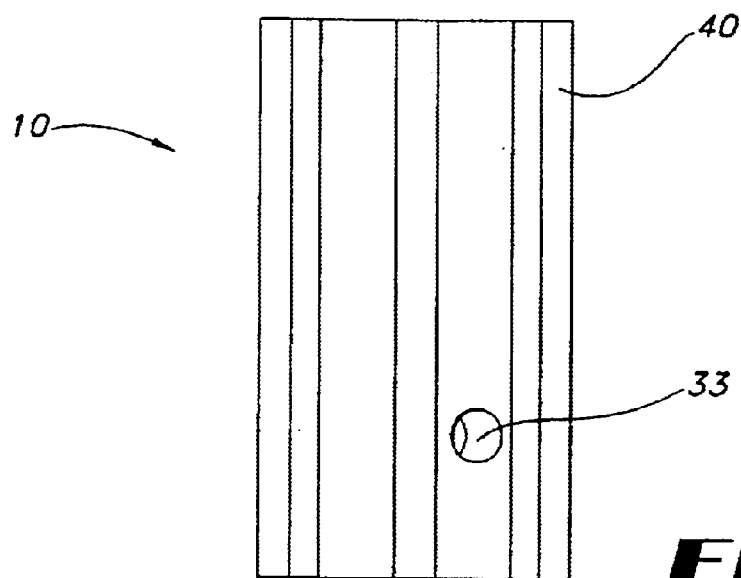
FIG. 1 is a side elevational view of an exothermic weld assembly of the preferred embodiment of the present invention.

FIG. 1 shows a side elevational view of an outer surface of the exothermic weld assembly of the preferred embodiment of the present invention. There is shown a weld assembly 10 having a vertical exterior flat surface 40 with a hole 33 drilled perpendicular into the flat surface 40, making the production of holes 33 more easy, accurate and efficient.

Figure 2:
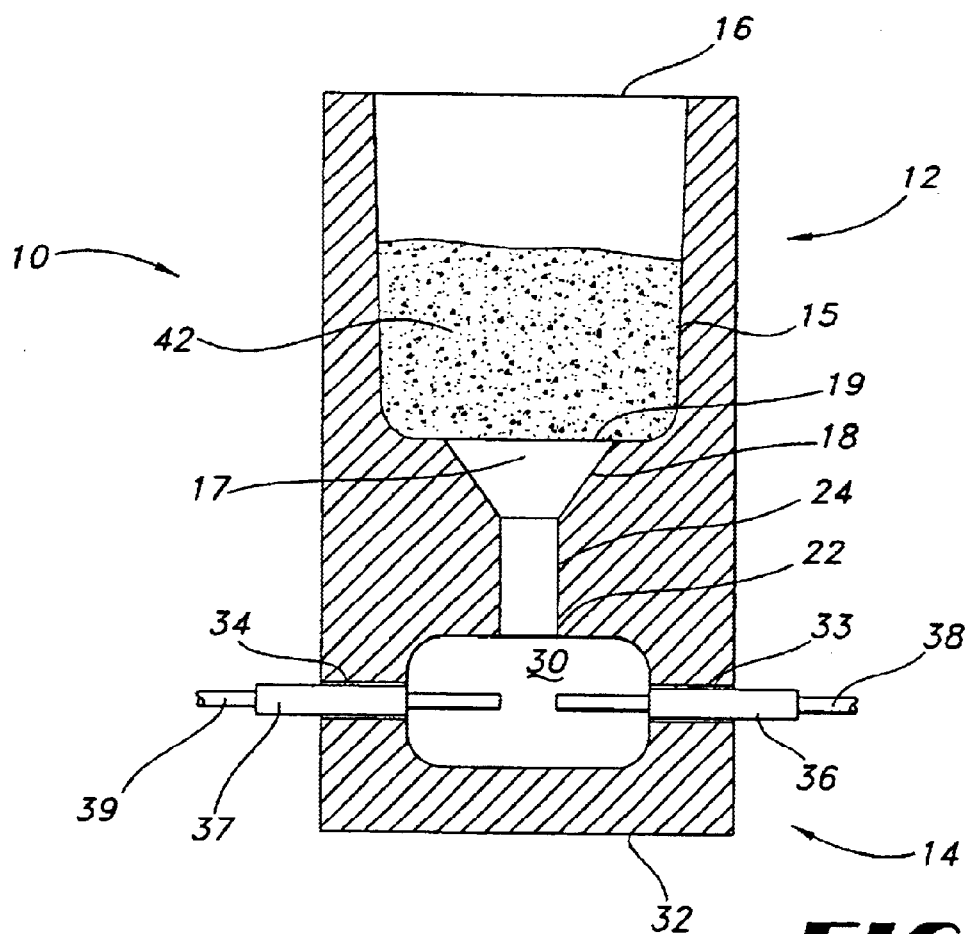
FIG. 2 is a cross-sectional view showing the interior sections of the exothermic weld assembly of FIG. 1 with conductors to be welded being disposed therein.

In FIG. 2, there is shown a cross-sectional view showing the interior section of the exothermic weld assembly of the present invention. In particular, FIG. 2 shows a disposable exothermic weld assembly 10 useful for forming welded connections between multiple conductors, such as between ground rods and wires. In the preferred embodiment, weld assembly 10 is a complete assembly, which includes everything that is required for an exothermic weld except for a flint igniter. Weld assembly 10 has two main sections: a crucible 12 on the top section and mold 14 located directly below the crucible 12 and communicating therewith.

Crucible 12 includes a generally U-shaped reaction chamber 15 with an open top 16. A lid (not shown) may be used to close the open top 16 of the reaction chamber 15. The reaction chamber 15 has stopper 19 in its bottom surface. Crucible 12 also has a downwardly projecting nozzle 17 including a tapering shoulder 18 around the nozzle 17 which seats on a mold top 22. In this manner, the crucible 12 is supported by the mold 14 in its upright position as illustrated in FIG. 2.

Mold 14 in FIG. 2 is preferably a refractory frangible mold located below the crucible 12. Mold 14 includes multiple flat exterior surfaces with guide holes 33 and 34 drilled perpendicular into the flat exterior surface (not shown). Centrally located weld chamber 30 is in communication with the exterior of the mold 12 by guide holes 33 and 34, as shown in FIG. 2. Mold 14 also includes a mold top 22 directly above the weld chamber 30 and a mold bottom 32. In the preferred embodiment, holes 33 and 34 are outfitted with hollow guide sleeves 36 and 37 prior to insertion of the conductors. It is contemplated that guide sleeves are inserted onto the conductors prior to insertion into mold 10 or not used at all. Mold 12 may include multiple guide holes and hollow guide sleeves projecting outwards from weld chamber 30. Conductors 38 and 39 that are to be connected enter the mold assembly via guide sleeves 36 and 37 with the ends of the connectors projecting into weld chamber 30.

As shown in FIG. 2, nozzle 17 projects downward from the reaction chamber 15 into the mold top 22. Reaction chamber 15 is communicably connected to weld chamber 30 by the vertically extending tap hole 24. Reaction chamber 15 in crucible assembly 12 includes a suitable quantity of exothermic material 42, which is prevented from entering tap hole 24 by the stopper 19. Starting powder may be placed on top of the exothermic material. Desirably, a flint gun (not shown) is used to ignite the exothermic material 42. When ignited, the exothermic material in reaction chamber 15 produces a reaction forming molten metal which melts the stopper 19 and flows through the tap hole 24 and into weld chamber 30 melting the conductor ends residing therein and forming a high ampacity, low resistance electrical connection between the connectors.

After the weld is made, the weld assembly 10 may be left in place or broken away from the welded conductors 38 and 39. Therefore, the design of the weld assembly 10 in FIG. 2 is disposable with crucible and mold are designed as a single unit, permanently attached and disposed after use.

Figure 3:
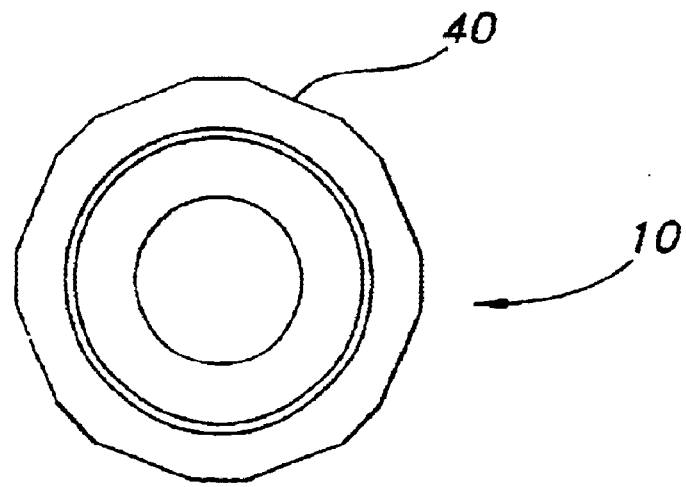
FIG. 3 is a top plan view of the exothermic weld assembly of FIG. 1.
Figure 4:
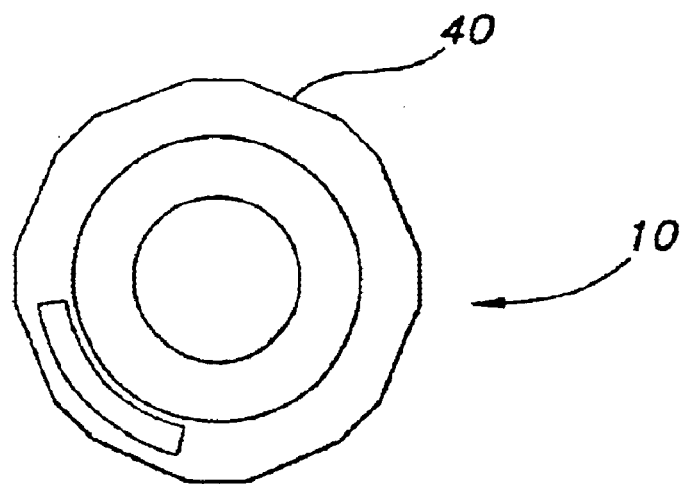
FIG. 4 is a bottom plan view of the exothermic weld assembly of FIG. 1.

As shown in FIGS. 3 and 4 the weld assembly is formed and shaped so that there are multiple flat, vertical exterior surfaces 40. Desirably, there are at least two flat surfaces to accommodate two conductors. Drilling on a flat surface 40 is much easier than drilling on a curved surface. It is contemplated that the mold of the present invention has multiple flat surfaces, which allow for easier and more efficient drilling of multiple holes in the weld assembly. Additionally, the weld assembly of the present invention enables holes to be better and more accurately positioned. Moreover, reliable and efficient drilling of holes will ensure a secure insertion of the guide sleeves into the holes preventing any leakage of the molten metal from the hole. Useful shapes for the outer surface of the mold include triangular, square, heptagonal, hexagonal, octagonal and the like. In the preferred embodiment, weld assembly 10 is octagonal as shown in FIGS. 3 and 4.

Desirably, the inside diameter of the hollow guide sleeves is selected to be larger than the largest conductor or cable designed to be used with the mold. For example, a single type or size of mold may accommodate a wide range of sizes of conductor. The guide sleeves may be any suitable metal including but not limited to copper, aluminum or steel.

Figure 5:
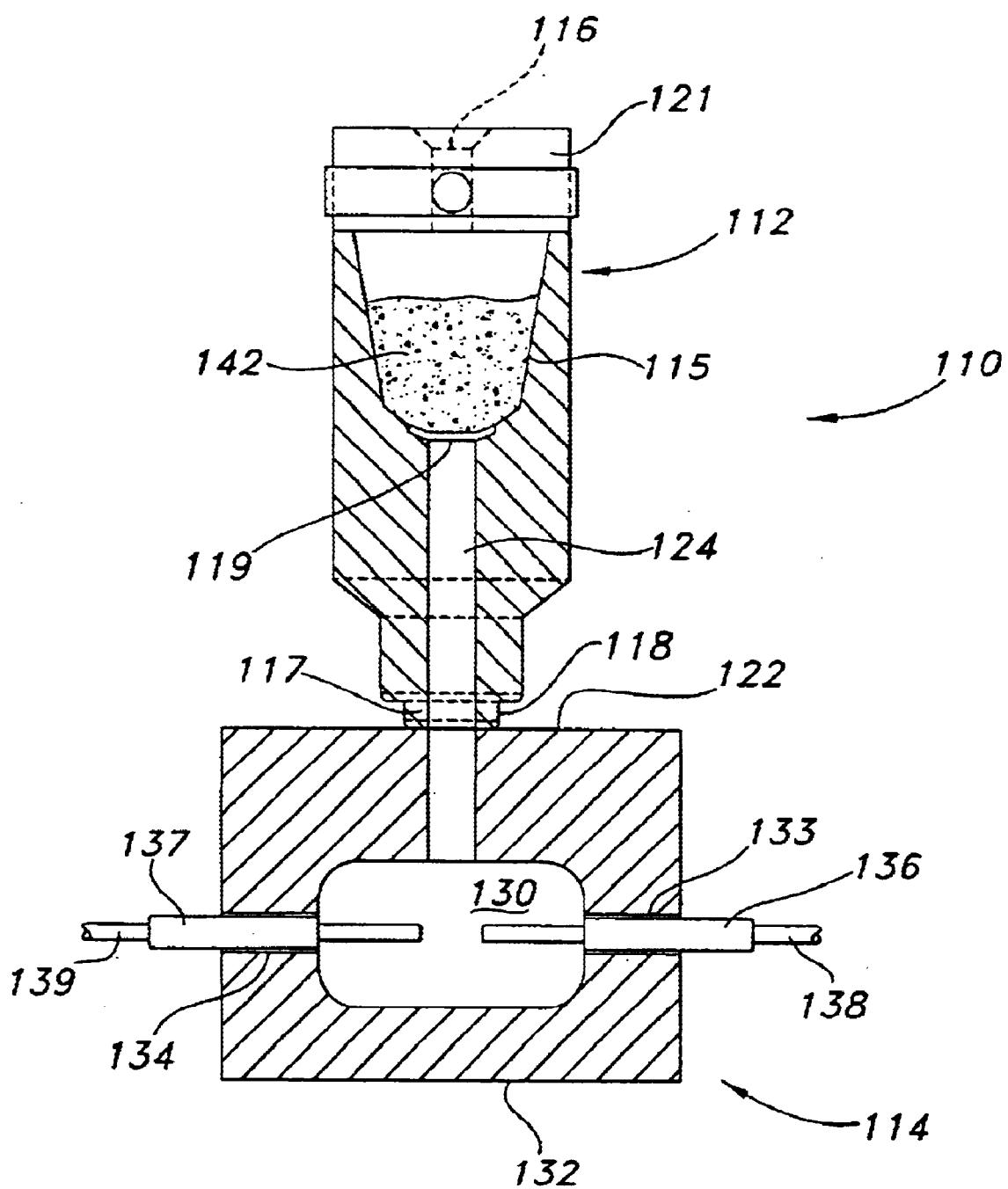
FIG. 5 is a cross-sectional view of an exothermic weld mold of another embodiment of the present invention.

The invention has been shown and described with respect to certain preferred embodiments, however, other various embodiments of the present invention are contemplated. For instance, the present invention contemplates that a single use, disposable mold may be utilized with a reusable crucible. FIG. 5 shows such an embodiment of the present invention wherein in the exothermic weld assembly 110, a mold 114 with multiple flat surfaces may be connected to a reusable crucible assembly 112, such as the crucible disclosed by U.S. Pat. No. 5,715,886 issued to Fuchs. Crucible 112 includes open crucible top 116, and preferably a crucible cover 121. The crucible 112 also includes a generally u-shaped reaction chamber 115 having a suitable quantity of exothermic material 142. Furthermore, the crucible 112 has an exothermic material stopper 119 which prevents the material from entering the tap hole 124.

Mold 114 in FIG. 5 is in communication with reusable crucible 112 by tap hole 124. Nozzle 117 has shoulders 118 leading to mold top 122. In this embodiment mold 114 is a disposable, single use refractory frangible mold which is vertically split and preferably form a weld chamber 130 opening to the sides and top of the mold. Mold 114 also includes a mold top 122, a bottom 132, and guide holes 133 and 134 drilled perpendicular to the flat exterior surface. The guide holes 133 and 134 are outfitted with guide sleeves 136 and 137 projecting outwards from the weld chamber 130 from each side. Conductors 138 and 139 are inserted into the guide sleeves 136 and 137 with the ends of the conductors 138 and 139 projecting into the weld chamber 130 from each side.

After the weld is made, the crucible is removed, cleaned and recharges for use again. At this point, the mold may be left in place or it may be broken away. Therefore, in the exothermic weld assembly 110 shown in FIG. 5, both the crucible 112 and mold 114 are designed as two individual units, which are temporarily attached, and the crucible 112 is reused while mold 114 is disposed after use.

The disposable weld assembly 10 in FIG. 2 and the mold section 114, as shown in FIG. 5, are made of a frangible refractory material, not intended to be used again. The frangible refractory body may be formed of a variety of materials including fired clays, sand molds, bonded calcined dolomite, graphite molds, glass and the like. Desirably, the exothermic weld assembly includes graphite or ceramic materials. Sand molds may be formed in a variety of ways as in foundry mold or core processes. These may include a variety of binder systems and include no-bake, heat cured, and cold box binder systems. In the no-bake and cold box processes, the binder is cured at room temperature. Some temperature sensitive materials, which indicate proper welding conditions, may be used.

The exothermic weld material typically is a mixture of reactants including a reducing agent, a metallic compound which is exothermically reduced by the reducing agent, and a filler metal that does not react with the metallic compound as disclosed in U.S. Pat. No. 5,062,903 issued to Bronan et al. Upon exothermically reacting the reducing agent and the metallic compound heat, a metal oxide slag, evolving gases and molten weld metal are produced.

The reducing agent may be selected from the group consisting of aluminum, magnesium, zirconium and equivalent metals which exhibit compounds which have a high thermodynamic heat of formation with respect to the reaction product between the metal and the metallic compound to be reduced.

The metallic compound may generally be selected from the group consisting of magnesium sulfate ($MgSO_4$), calcium sulfate ($CaSO_4$), and barium sulfate ($BaSO_4$), fluoride compounds, and equivalent materials which upon reduction contribute one or more elements to exothermically form a compound with the reducing agent. Desirably, the metallic compound is utilized in an anhydrous form and all of the reactants are protected from moisture prior to use. Moisture contamination may suppress the exothermic reaction.

The filler metal of the present invention may be any metal which is desired to be utilized in a welding process. Because of their use in electric transmission applications, aluminum and copper are particularly useful as filler metals to weld aluminum or copper articles respectively.

The mixture of reactants may additionally include a flux to lower the melting point of the mixture and products. Commonly utilized fluxes include calcium fluoride ($CaF_2$), magnesium fluoride ($MgF_2$), cryolite ($Na_3AlF_6$), and other substances such as alkali compounds, particularly alkali silicates and fluorosilicates. Fluxes may be used to lower the fusion point and increase the fluidity of the reaction products (i.e., "slag") such that the molten filler metal can readily be separated from the slag and flow into the mold cavity.

While the invention has been described by the foregoing detailed description in relation to the preferred embodiments with several examples, it will be understood by those skilled in the art that various changes may be made without deviating from the spirit and scope of the invention as defined in the appended claims.

What is claimed is:

1. An exothermic disposable weld mold assembly comprising:
    a crucible section including a reaction chamber; and
    a mold section having a weld chamber in communication with said reaction chamber, said mold section including a plurality of flat exterior surfaces wherein said mold section formed by said exterior surfaces has a heptagonal, hexagonal or octagonal shape, and wherein at least two of such surfaces each having a hole extending therethrough in communication with said weld chamber.

2. The exothermic disposable weld mold assembly of claim 1, wherein the reaction chamber includes an open top for receiving an exothermic material.

3. The exothermic disposable weld mold assembly of claim 1, wherein the reaction chamber includes a stopper for preventing the exothermic material from entering the weld chamber.

4. The exothermic disposable weld mold assembly of claim 1, wherein the mold section includes a mold top.

5. The exothermic disposable weld mold assembly of claim 4, wherein the crucible section further includes a nozzle which projects downward from the reaction chamber to the mold top.

6. The exothermic disposable weld mold assembly of claim 5, wherein said nozzle comprises a tapered shoulder leading to the mold top.

7. The exothermic disposable weld mold assembly of claim 1, wherein a hollow guide sleeve is disposed in each of said holes and projects outwardly from the weld chamber.

8. The exothermic disposable weld mold assembly of claim 7 wherein conductors are disposed into the mold section through the guide sleeves with ends of the conductors projecting into the weld chamber.

9. The exothermic disposable weld mold assembly of claim 1, wherein the flat surfaces of the mold section allow for drilling of holes in the exothermic weld mold assembly.

10. The exothermic disposable weld mold assembly of claim 1, wherein the assembly is made of a frangible refractory material.

11. The exothermic disposable weld mold assembly of claim 10, wherein the frangible refractory material includes graphite.

12. The exothermic disposable weld mold assembly of claim 1, wherein the frangible refractory material includes ceramic.

13. An exothermic weld mold assembly comprising:
    a reusable crucible having a reaction chamber with an open top for receiving an exothermic material in said reaction chamber;
    a disposable mold having a plurality of flat exterior surfaces, a top portion and a bottom portion, and a weld chamber therebetween, wherein said mold formed by said exterior surfaces has a heptagonal, hexagonal or octagonal shape, and wherein the weld chamber being open to the top portion in communication with said reaction chamber;
    a hole extending through at least two of said flat exterior surface and communicating with said weld chamber; and
    a conductor disposed in said at least two holes with ends of the conductors projecting into the weld chamber.

14. The exothermic weld mold assembly of claim 13 wherein the weld chamber and the reaction chamber are communicably connected by a tap hole.

15. The exothermic weld mold assembly of claim 14 wherein the reaction chamber includes a stopper for preventing the exothermic material from entering the tap hole.

16. The exothermic weld mold assembly of claim 13 wherein a hollow guide sleeve is disposed in each of said holes and projects outwardly from the weld chamber.

17. The exothermic weld mold assembly of claim 13, wherein the mold is made of frangible refractory material.

* * * * *